Dec. 23, 1930.  H. A. DENMIRE  1,786,290
METHOD OF VULCANIZING HOLLOW RUBBER ARTICLES
Filed May 12, 1927

INVENTOR
Harold A Denmire
BY Evans & McCoy.
ATTORNEYS

Patented Dec. 23, 1930

1,786,290

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

METHOD OF VULCANIZING HOLLOW RUBBER ARTICLES

Application filed May 12, 1927. Serial No. 190,757.

This invention relates to a system of vulcanizing inflatable rubber goods and it has for its primary object the provision of a system for inflation of such goods during vulcanization that will overcome the objectionable oxidation of the goods during the curing process.

Because of the objectionable oxidation that results from the use of air as an inflation medium for rubber goods, the use of carbon dioxide gas, hot water under pressure, and other inactive fluids have heretofore been proposed for such service. When inert fluids were not used it has been customary to vulcanize the goods under less inflation pressure than would otherwise have been used because of the increasing detrimental effects of oxidation with increase of air pressure or, as in the case of air bags used in the vulcanization of tire casings, it has been customary to charge the bag with glycerine or some other substance for preventing the oxidation of the interior of the bag during the curing process.

The present invention proposes a system of vulcanization that may be used to initially provide and also conserve the supply of inert fluid that is used in the inflation of the article being vulcanized whereby vulcanization with these fluids is rendered much less expensive than heretofore. Because of the expense of using inert gases in previously proposed inflation systems, it has heretofore been customary to inflate the rubber goods with air under less inflation pressure than would otherwise have been used had objectionable oxidation been avoidable at the higher pressures.

One of the objects of the present invention is to provide a system of vulcanization in which the inflating medium for the rubber goods being vulcanized is used over and over again thus conserving the supply of such fluid medium and reducing the ultimate cost of the use thereof.

An additional object of the invention is to provide a system of vulcanization wherein an inert gas is provided from atmospheric air that is initially used in the vulcanizing process without the danger of oxidation from its use in the curing of inflatable rubber objects.

Figure 2:
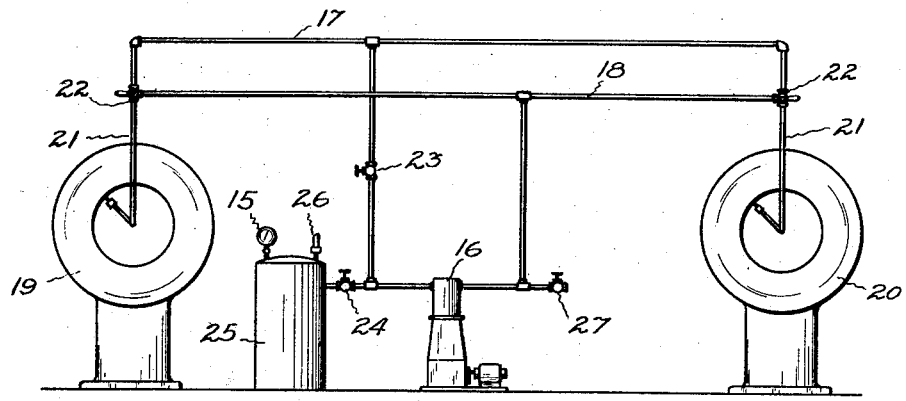
Figure 1:
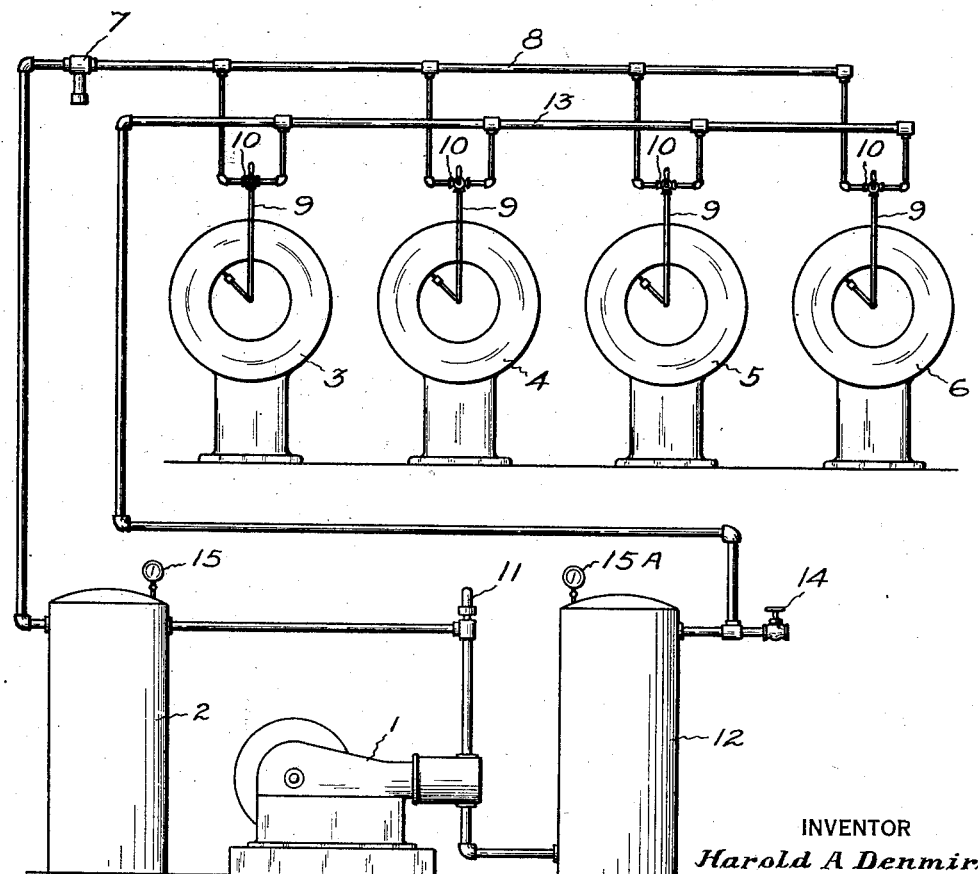

A system embodying the invention is shown in the accompanying drawing wherein:

Figure 1 is a diagrammatic view of a battery of vulcanizing units shown equipped with an inflation system constructed in accordance with the present invention; and Fig. 2 is a corresponding diagrammatic view of a vulcanizing system embodying the invention and primarily adapted for use in small installations.

The system shown in Fig. 1 of the drawing is particularly intended for use in connection with a battery of heaters and it comprises a compressor 1 that maintains fluid pressure in pressure tank 2 of substantially two times the desired inflation pressure for the article to be vulcanized in heater units 3, 4, 5 and 6. A pressure regulating valve 7 that is adjustable to give the desired inflation pressure is interposed between the pressure tank 2 and the header 8 to which each of the inflation tubes 9 of the vulcanizers is respectively connected through suitable three-way valves 10. The pressure system also has a conventional release valve 11 that prevents the building up of dangerous pressures in the pressure tank 2.

The intake of the compressor 1 is connected to a vacuum tank 12 that is connected to a header 13 which in turn communicates with each of the inflation tubes 9 through the three-way valve 10. A suitable valve 14 is interposed in the suction line for charging the system. Suitable pressure gauges 15 and 15a are used with the respective tanks.

The operation of the system is essentially as follows: It is first charged with a suitable inflating fluid such as air, carbon dioxide gas or other fluid and the pressure of tank 2 built up to the desired degree by operation of the compressor. The pressure in this tank in the system shown is preferably regulated automatically by the relief valve 11 that permits the release of any oversupply of inflating fluid in the system.

The pressure reducing valve 7 maintains the pressure within the header 8 the desired degree for proper inflation of the article being cured in the mold within the heaters 4, 5 and 6. When hollow rubber articles are being manufactured, a small quantity of ammonia carbonate powder is inserted in the cavity of the article to assist in vulcanization. When a unit is placed within one of the heaters the corresponding inflation tube 9 is connected thereto in any suitable manner. The three-way valve 10 is then turned to the direction that connects the heater 8 with the inflation tube 9. This brings the inflation of the tube to substantially line pressure which in this case is the pressure desired for vulcanization of the article.

After the article is vulcanized and is ready to be removed from the heater, the corresponding three-way valve 10 is turned to the direction that establishes connection from the corresponding inflating tube to the suction header 13. The inflated article will be deflated very rapidly by this arrangement because of the differential pressure between the article and the suction header 13. It is generally desired that the pressure within the vacuum or suction tank 12 be maintained at a relatively low value in order to assist in exhausting the air from the article being vulcanized.

It has been found that the gases that are released from the article being vulcanized and from the small quantity of ammonia carbonate used in the vulcanization adds considerably to the volume of gas initially used in the article and this released fluid has been found to more than compensate for any normal loss of the inflating medium during the operation of the system. If, however, additional inflating medium is desired from time to time this may conveniently be supplied from the atmosphere by opening the valve 14 a sufficient degree to admit the desired quantity of outside air. It has also been found that in the vulcanization of inflated rubber materials, the oxygen of the air that is used for inflating purposes is rapidly exhausted leaving only a relatively inert gas. This enables the operator to use air instead of the expensive carbon dioxide gas or other expensive fluids in vulcanization because, even if the entire system is originally charged with air instead of carbon dioxide gas, the vulcanization of inner tubes for instance during the first operations of the system can be carried on at substantially the inflation pressure that is used in connection with such articles at the present time. The vulcanization process at this pressure will sufficiently exhaust the oxygen content from the air used to render it substantially inert during subsequent vulcanizations. The inflating pressure after the first few vulcanizing cycles may be increased to the desired high pressure without danger of oxidation of the rubber goods being vulcanized thereby. This permits the use of atmospheric air without the dangers of oxidation of rubber compounds under high inflation pressures. Incidentally, high inflation pressures are desired for the better class of goods because of the material improvement in the quality of the rubber that is produced by vulcanizing it while under the higher pressures. Heretofore advantage could not readily be taken of this characteristic of the inflatable rubber goods because of the prohibitive expense of inflating with carbon dioxide or other inert gases, whereas with applicant's proposed system the expense of obtaining inert fluids is substantially avoided and the system by means of which the repeated use of the inflating medium is made possible is of inexpensive character.

It is also important in connection with inflatable rubber articles that deflation occur as soon after the vulcanization of the article is completed as can consistently be done. If this deflation is delayed so that it progresses very slowly, the outside of the article becomes spotted and marked so that the article is generally rejected from first class merchandise.

The vulcanizing system shown in Fig. 2 is a modification of the system shown in Fig. 1 particularly intended for use in connection with a small number of heater units that do not warrant the expense of the more complete system shown in Fig. 1.

In the system shown in Fig. 2 a compressor 16 communicates directly with a distributing pressure header 17 and a suction header 18. Each of the mold units 19 and 20 has an inflating tube 21 that is arranged to be independently connected to either the pressure header 17 or the suction header 18 by a suitable three-way valve 22 of the same character as the valves 10 used in the system shown in Fig. 1. Suitable cut-off valves 23 and 24 are respectively interposed between the pressure side of the pump 16 and the distributing header 17 and also between the pump 16 and a reserve pressure tank 25. The pressure tank 25 has a relief valve 26 of conventional character associated therewith. A valve 27 provides communication to the suction side of the header for use in charging the system. The three-way valve 22 that leads to the inflation tube 21 is then moved to the position where it admits inflation pressures to such article as is being vulcanized within the heater 19. After the article is inflated the proper degree, the three-way valve is closed so that both the pressure header 17 and the suction header 18 are cut off from communication with the inflating tube 21.

After vulcanization of the article contained in the heater 19, the corresponding three-way valve 22 is turned to establish communication with the suction header 17. The air within the inflated article is rapidly exhausted into the suction header from which it passes back through the pump 16 to the pressure header 17. The article being vulcanized within the mold 20 is then connected to the pressure header through the corresponding three-way valve and the inflation tube 21. This serves to bring the pressure of the article being inflated within the heater 1 to the desired value whereupon the valve 22 is closed and the vulcanization of the article within the heater proceeded with. It will also be understood that after vulcanization of the article contained in the heater 20 is completed, the inflating medium for the article in heater 20 is transferred to the article to be vulcanized in heater 19 in the manner heretofore described. This comprises in general, the operation of the system shown in Fig. 2. The pressure storage tank 25 is required only when it is desired to use one mold or if it is desired that the system be periodically shut down. If the system is to be shut down, the valve 23 is closed and the valve 24 is opened to permit the accumulation of the inflating medium of the system in the pressure tank 25. The valve is then closed to conserve the inflating medium.

The various advantages to be enjoyed from practicing the invention will be apparent to those skilled in the art. Broadly considered, the practice of the invention permits the enjoyment of the benefits of using an inert inflating medium without the associated expense of the inflating medium heretofore employed. The practice of the present invention also permits the use of high inflation pressures for such articles as inner tubes wherein the use of high inflation pressure produces a much superior quality of merchandise, and it provides a system of vulcanization that is commercially practical for the vulcanization of tire casings without the use of air bags for the inflation thereof.

The system is also applicable to the manufacture of pneumatic tire casings that are expanded by means of an inflating air bag during the vulcanizing process. Practice of the present invention avoids the destructive oxidation of the inside of air bags and also permits the use of air bags that are not internally treated with glycerine or other compounds for preventing cracks or breaks in the inside of the bag as the result of oxidation very familiar to those skilled in the art. These advantages are commercially important as will be recognized.

Although I have shown the invention as embodied in only two systems it will be obvious that other arrangements thereof may be effected without departing from the spirit and scope of the invention. I desire, therefore, that only such limitations be imposed on the invention as are set forth in the accompanying claims.

What I claim is:

1. In the vulcanization of rubber articles, the process of inflating an article to be vulcanized from a source of air under pressure, evacuating the article being vulcanized, storing the air so evacuated, and repeatedly using the same air for inflating articles subsequently vulcanized.

2. In the vulcanization of rubber articles, the process of repeatedly using the same air for the vulcanization of a succession of rubber articles.

3. In the vulcanization of rubber articles, the process of repeatedly using the same air for the vulcanization of a succession of rubber articles and of compensating for loss of the inflating medium by the introduction of ammonia carbonate in the articles.

4. In the vulcanization of hollow rubber articles, the herein described method of producing and supplying to the interior of such articles during vulcanization, a substantially inert gaseous medium, which comprises collecting and confining a body of air, introducing a portion of the air under pressure into a hollow article during the vulcanization thereof, evacuating the article after vulcanization and returning the air together with gaseous products of vulcanization to the confined body of air, and repeatedly using the gaseous mixture so produced for the inflation of articles subsequently vulcanized.

In testimony whereof I affix my signature.

HAROLD A. DENMIRE.